US008787389B2

(12) United States Patent
Arvind et al.

(10) Patent No.: US 8,787,389 B2
(45) Date of Patent: Jul. 22, 2014

(54) LOW POWER MEDIA ACCESS CONTROL PROTOCOL

(75) Inventors: Damal K. Arvind, Edinburgh (GB); Kai Juan Wong, Singapore (SG)

(73) Assignee: The University Court of the University of Edinburgh, Edinburgh (GB)

( * ) Notice: Subject to any disclaimer, the term of this patent is extended or adjusted under 35 U.S.C. 154(b) by 830 days.

(21) Appl. No.: 12/227,253

(22) PCT Filed: May 11, 2007

(86) PCT No.: PCT/GB2007/001729
§ 371 (c)(1),
(2), (4) Date: Apr. 7, 2009

(87) PCT Pub. No.: WO2007/132196
PCT Pub. Date: Nov. 22, 2007

(65) Prior Publication Data
US 2009/0323571 A1 Dec. 31, 2009

(30) Foreign Application Priority Data
May 12, 2006 (GB) .................................. 0609426.2

(51) Int. Cl.
*H04L 12/28* (2006.01)
(52) U.S. Cl.
USPC .......................... 370/395.4; 370/311; 370/338
(58) Field of Classification Search
USPC ......... 370/216, 252, 311, 318, 337, 389, 320, 370/312, 344, 352, 329, 328, 330, 394, 350, 370/395.4; 455/355, 11.1, 181.1, 458, 561, 455/515; 709/229, 227
See application file for complete search history.

(56) References Cited

U.S. PATENT DOCUMENTS

| 6,085,328 | A * | 7/2000 | Klein et al. .................. 713/310 |
| 6,366,957 | B1 * | 4/2002 | Na ................................. 709/229 |
| 7,715,855 | B2 * | 5/2010 | Subrahmanya ............... 455/458 |
| 7,869,390 | B2 * | 1/2011 | Singh et al. .................... 370/311 |
| 7,873,018 | B2 * | 1/2011 | Kakani .......................... 370/338 |
| 7,877,117 | B2 * | 1/2011 | Abhishek et al. ............. 455/574 |
| 2001/0008391 | A1 * | 7/2001 | Yuasa ...................... 340/310.01 |
| 2002/0077139 | A1 * | 6/2002 | Bouet ............................ 455/522 |
| 2002/0085488 | A1 * | 7/2002 | Kobayashi .................... 370/216 |
| 2003/0005387 | A1 * | 1/2003 | Tsunoda ........................ 714/785 |
| 2004/0190467 | A1 * | 9/2004 | Liu et al. ....................... 370/311 |
| 2005/0003794 | A1 * | 1/2005 | Liu ................................ 455/355 |

(Continued)

FOREIGN PATENT DOCUMENTS

| EP | 1 750 473 A1 | 2/2007 |
| GB | 2 315 964 A | 2/1998 |
| WO | WO 2005/117482 | 12/2005 |

OTHER PUBLICATIONS

Qingchun Ren et al.: "An energy-efficient MAC protocol for wireless sensor networks", Global Telecommunications Conference 2005, Globecom 05, IEEE St. Louis, MO; Nov. 28-Dec. 2, 2005, pp. 157-161, XP010881278, ISBN: 0/7803-4141-3.

J. Polastre et al.: "Versatile low power media access for wireless sensor networks", Proceedings of The Second ACM Conference on Embedded Networked Sensor Systems, Nov. 3, 2004, XP002448271, abstract, section 4.3 and 8.

(Continued)

*Primary Examiner* — Abdullah Riyami
(74) *Attorney, Agent, or Firm* — Harrington & Smith

(57) ABSTRACT

A method of transmitting data from a transmitter to a receiver in an unsynchronized, ad-hoc, low-power, wireless network including: creating a packet including a header and data; and retransmitting the same created packet a plurality of times in succession.

16 Claims, 4 Drawing Sheets

(56) References Cited

U.S. PATENT DOCUMENTS

| | | | |
|---|---|---|---|
| 2005/0018624 A1* | 1/2005 | Meier et al. | 370/318 |
| 2005/0036466 A1* | 2/2005 | Malik et al. | 370/338 |
| 2005/0053047 A1* | 3/2005 | Osterloh et al. | 370/344 |
| 2005/0136833 A1* | 6/2005 | Emeott et al. | 455/11.1 |
| 2005/0138451 A1* | 6/2005 | Simpson et al. | 713/320 |
| 2005/0254459 A1* | 11/2005 | Qian | 370/328 |
| 2006/0013169 A2* | 1/2006 | Boynton | 370/337 |
| 2006/0039373 A1* | 2/2006 | Nakamura et al. | 370/389 |
| 2006/0104301 A1* | 5/2006 | Beyer et al. | 370/445 |
| 2007/0008916 A1* | 1/2007 | Haugli et al. | 370/320 |
| 2007/0140157 A1* | 6/2007 | Fu et al. | 370/318 |
| 2007/0160003 A1* | 7/2007 | Meier | 370/329 |
| 2007/0165593 A1* | 7/2007 | Hundal et al. | 370/349 |
| 2007/0183355 A1* | 8/2007 | Kuchibhotla et al. | 370/318 |
| 2007/0230493 A1* | 10/2007 | Dravida et al. | 370/412 |
| 2007/0259700 A1* | 11/2007 | Meier et al. | 455/574 |
| 2008/0198785 A1* | 8/2008 | Huang et al. | 370/312 |
| 2009/0252135 A1* | 10/2009 | Benveniste | 370/338 |
| 2009/0267770 A1* | 10/2009 | Twitchell, Jr. | 340/572.1 |
| 2010/0184455 A1* | 7/2010 | Subrahmanya | 455/458 |
| 2010/0275243 A1* | 10/2010 | Eldar | 726/2 |
| 2011/0045875 A1* | 2/2011 | Rhee et al. | 455/574 |

OTHER PUBLICATIONS

Rajendran V et al.: "Energy-Efficient, Collision-Free Medium Access Control for Wireless Sensor Networks", Wireless Networks, ACM, New York, NY; vol. 12, No. 1, Feb. 2006, XP001501597, ISSN: 1022-0038, pp. 63-78.

El-Hoiydi A et al.: "WiseMAC: An Ultra Low Power MAC Protocol for the Downlink of Infrastructure Wireless Sensor Networks", Computers and Communications 2004, Proceedings. ISCC 2004. Ninth International Symposium on Alexandria, Egypt, Jun. 28-Jul. 1, 2004, Piscataway, NJ. IEEE vol. 1, Jun. 28, 2004, pp. 244-251, XP010741927.

Wong et al., "SpeckMAC: Low-Power Decentralised MAC Protocols for Low Data Rate Transmissions in Specknets", (2006), (9 pages).

McNally, et al., "A Distributed Algorithm for Logical Location Estimation in Speckled Conputing", (2005), (6 pages).

Amre El-Hoiydi, "Spatial TDMA and CSMA with Preamble Sampling for Low Power Ad Hoc Wireless Sensor Networks", (2007), (8 pages).

Arvind et al., "Counting and Colouring in Specknets", Research Consortium in Speckled ComputingSchool of Informatics, University of Edinburgh, (Apr. 2005), (4 pages).

* cited by examiner

LOW POWER MEDIA ACCESS CONTROL PROTOCOL

FIELD OF THE INVENTION

Embodiments of the present invention relate to a low power Media Access Control (MAC) protocol. In particular they relate to a low power MAC protocol for use in an unsynchronised, ad-hoc, low-power, wireless network.

BACKGROUND TO THE INVENTION

An ultra low power MAC protocol is described in "Versatile low power media access for wireless sensor networks", In Proceedings of the Second ACM SensSys, November 2004 by Polastre, J. Hill, and D. Culler.

The protocol, the B-MAC protocol, describes a random access MAC protocol that does not require nodes to be synchronised.

A source node sends, in the communication channel, a long preamble having a duration $T_{preamble}$ followed by a data packet. Periodically (every $T_{interval}$) a possible destination node listens to the communications channel for activity. If no activity is detected the destination node keeps listening until a timeout period has expired. If activity is detected, the destination node turns on a receiver which is turned off after a data packet has been received or after a timeout period. The period $T_{preamble}$ is greater than the period $T_{interval}$.

It will of course be understood by those skilled in the art that a preamble is a fixed predetermined sequence of bits (often 01 repeated) which is used by a correlator detector for asynchronous detection. The preamble does not, as such, convey information itself as it is fixed and predetermined.

It would be desirable to provide a MAC protocol that is more energy efficient.

BRIEF DESCRIPTION OF THE INVENTION

According to one embodiment of the invention there is provided a method of transmitting data from a transmitter to a receiver in an unsynchronised, ad-hoc, low-power, wireless network comprising: creating a packet comprising an address and data; and retransmitting the same created packet a plurality of times in succession.

The "same" created packet will convey the same information content when transmitted i.e. the packets are informationally redundant, however, depending on implementation, the exact physical content of the packets may change from packet to packet.

According to one embodiment of the invention there is provided an electronic communication device for transmitting data to a receiver using an unsynchronised, ad-hoc, low-power, wireless network, the device comprising: means for creating a packet comprising an address and data; and means for retransmitting the same created packet a plurality of times in succession.

According to one embodiment of the invention there is provided a method of receiving data transmitted from a transmitter in an unsynchronised, ad-hoc, low-power, wireless network, the method comprising: switching on a receiver according to a first schedule; detecting reception of a packet transmitted without a schedule; extracting data from the received packet; and switching off the receiver until it is next scheduled to be switched on.

According to one embodiment of the invention there is provided an electronic communication device for receiving data transmitted from a transmitter in an unsynchronised, ad-hoc, low-power, wireless network, the device comprising: a receiver operable to detect reception of a packet transmitted without a schedule; and processing circuitry operable to switch on the receiver according to a first schedule, to extract data from a received packet and to switch off the receiver until it is next scheduled to be switched on.

According to one embodiment of the invention there is provided a method of receiving data transmitted from a transmitter, the method comprising: switching on a receiver according to a first schedule; detecting reception of an information packet transmitted without a schedule; extracting time data from the received packet; switching off the receiver for a duration determined by the time data and then switching the receiver on; and detecting reception of a data packet transmitted without a schedule.

There may follow extraction of data from the received packet; and then switching off the receiver until it is next scheduled to be switched on.

Embodiments of the invention preserve energy resources of the network by placing the energy cost of communication predominantly onto the transmitter. This makes embodiments of the invention particularly suitable where there are low data communication rates and/or packets are broadcast such that one transmitter communicates with many receivers.

The energy cost is transferred to the transmitter by using multiple redundant packet retransmissions.

BRIEF DESCRIPTION OF THE DRAWINGS

For a better understanding of the present invention reference will now be made by way of example only to the accompanying drawings in which.

DETAILED DESCRIPTION OF EMBODIMENTS OF THE INVENTION

Figure 1:
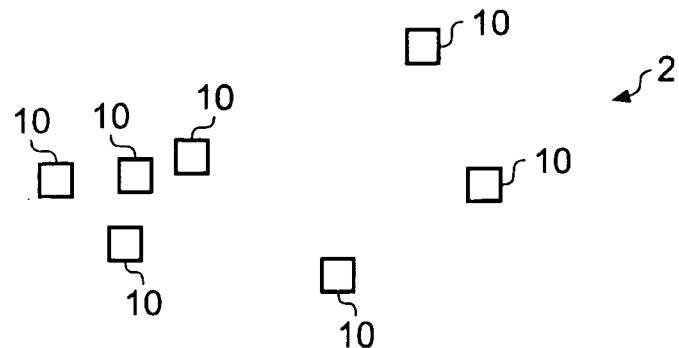
FIG. 1 schematically illustrates a network of nodes.

FIG. 1 schematically illustrates a network 2 of nodes 10. An individual node 10 is illustrated in FIG. 2.

Figure 2:
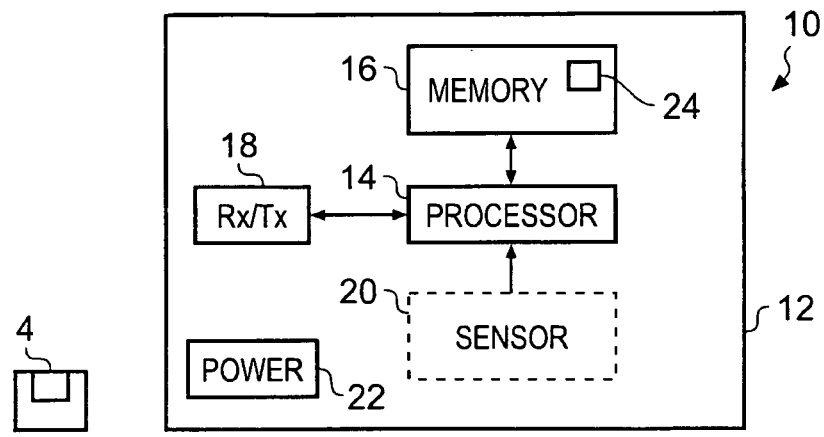
FIG. 2 schematically illustrates an individual node of the network in more detail.

The node 10 in FIG. 2 is a small electronic communications device 12 comprising components: processing circuitry 14; memory circuitry 16; a wireless transceiver 18 and, optionally, a sensor 20. Each node 10 also has an energy source 22 which may be, for example, a battery.

The components may be discrete components or may be integrated into a single device such as an integrated circuit chip.

A term coined by the inventor for the device 12 is a 'speck' as it is expected that the devices 12 will be manufactured on the nano or micro scale. The specks may be sprayed onto surfaces where they create a network 2 of shared resources.

The network may be used for distributed applications such as sensing, processing etc. Such specks will enable ubiquitous or pervasive computing by embedding functionality within other objects such as clothes, fabrics etc.

The processing circuitry 14 may be, for example, a programmable microprocessor unit or an application specific integrated circuit. It is arranged to read from and write to the memory 16, to receive input from the sensor 20, if present, and from the wireless transceiver 18 and to provide output to the wireless transceiver 18.

The wireless transceiver 18 is typically a radio transceiver that operates with low transmission power (e.g. in the range −35 dBm to −15 dBm, in one example of the order 125 dBm). This is equivalent to a communication range of a few cms or a few tens of cms depending on the application. The transceiver comprises a transmitter part for transmitting and a receiver part for receiving.

The memory circuitry 16 may be any suitable memory. It may be comprised of one or more separate units and some or all of it may be integrated with the processing circuitry 14. The memory 16 stores data for transmission and data received via the wireless transceiver. If the processing circuitry 14 is a programmable processor, the memory 16 may also store computer program instructions 24.

The computer program instructions 24 control the operation of the electronic communications device 12 when loaded into a programmable processor 14. The computer program instructions 24 provide the logic and routines that enables the electronic device 12 to perform the methods illustrated in FIGS. 4A-4C and 5A-5C.

The computer program instructions may arrive at the electronic communications device 10 via an electromagnetic carrier signal or be copied from a physical entity 4 such as a computer program product, a memory device or a record medium such as a CD-ROM or DVD.

The sensor 20 senses or detects a parameter of the environment in which the device 12 is located. It is described as optional as none, all, or some of the nodes 10 in the network may comprise sensors. If some of the nodes of the network comprise integrated sensors then the network 2 is also a sensing network. The network 2 is used to distribute measured parameters.

As described in D. K. Arvind, K. J. Wong, "Speckled Computing: Disruptive Technology for Networked Information Appliances", in Proceedings of the IEEE International Symposium on Consumer Electronics, (U.K.), pp. 334-338, September 2004, the processor may be a CY8C29666 programmable system on chip (SoC), the radio transceiver may be a CC2420 radio chip with onboard antenna.

It will therefore be appreciated that a node 10 will have means for communicating with other nodes and also means for processing data for transmission and data that has been received.

The network 2 is an ad-hoc network in the sense that it does not have a formal arrangement of nodes but is formed with the impromptu arrangement of nodes at the time the network is initiated. This arrangement may change at any time during the lifetime of the network. Nodes may leave and join the network at un-predetermined times.

A node 10 is capable of establishing one or more communication links with other nodes in the network 2. As the wireless transceiver 18 is typically low power, the wireless links have a limited range so that a node may only form links with nodes within this range.

A node 10 may form a link with a specific node by sending a transmission addressed to that node or may form a link with multiple nodes at once by sending a transmission addressed as a broadcast transmission to the nodes within range.

The nodes 10 may be mobile so that arrangement of nodes may vary with time and the links between nodes may vary over time as nodes move into and out of range.

The network 2 is arranged as a peer-to-peer (P2P) network in which each node is an equal within the network and there are no base stations, Masters and Slaves etc. The organisation and management of the network is therefore distributed as there is no leader.

The network 2 is unsynchronised in that there is no common time frame shared by all the nodes. However, each node 10 will have a clock which is used as a local time reference.

As the network 2 is unsynchronised, transmission at one node and reception at another node are uncoordinated. A node 10 transmits in a random-access fashion i.e. it transmits on-demand without the use of a transmission schedule.

The network 2 of nodes 10 is a collection of processing and memory resources and also optionally sensor resources. These resources are used in a coordinated fashion by the network as a whole using the inter device wireless communication links.

The network 2 may be dense but with low data rates for the links between nodes. The network 2 uses a media access control (MAC) protocol that has a greater energy cost associated with transmission that reception.

Figure 3A:
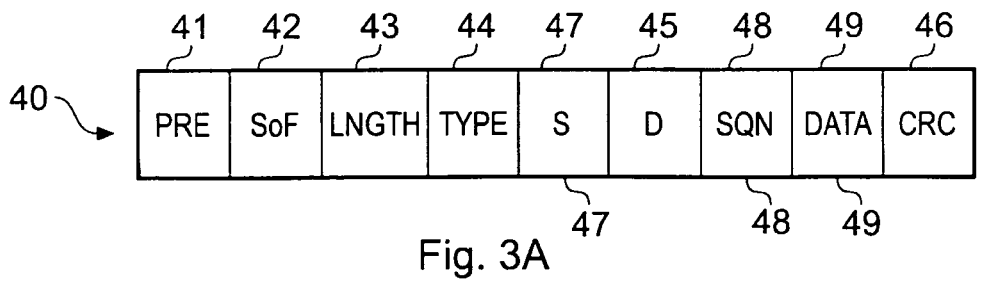
FIG. 3A schematically illustrates a data packet.
Figure 3B:
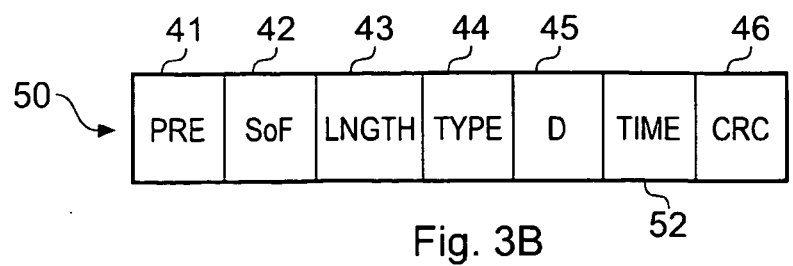
FIG. 3B schematically illustrates an information packet.

FIG. 3A schematically illustrates a data packet 40 and FIG. 3B schematically illustrates an information packet 50. Each packet conveys information from the transmitter to the receiver and depending on circumstances the information content will be different, that is, it is not fixed.

The data packet 40 has a plurality of fields 41-49 and the information packet has a plurality of fields 41-46 and 52.

The fields common to both types of packets 41-46 include: a short preamble field 41; a start of frame (SOF) delimiter field 42; an end of packet identifier field 43; a packet type field 44; a destination address field 45; and an error detection (CRC) field 46.

Each packet has a header portion that includes: a short preamble field 41; a start of frame (SOF) delimiter field 42; a packet length field 43; a packet type field 44; and one or more address fields 45, 47.

The fields have predetermined fixed sizes. The short preamble 41 allows a receiving node to synchronise with the start of the packet. The SOF 42 identifies the beginning of the remaining fields. This allows the contents of the remaining fields to be extracted.

The packet length 43 allows the receiver, which has knowledge of when the packet begins to determine when the packet finishes.

The type field 44 differentiates different packet types. For example it identifies a packet as a data packet 40 or an information packet 50.

The destination address 45 is the address to which the packet is sent. It may be, for example, a broadcast address which indicates that it is for the attention of any node that can receive it. Alternatively, the address may be a node specific address or an address specific to a set of nodes.

The error detection field 46 may be any suitable field that enables the receiving node to confirm that the content of the packet has been correctly received. In this example, the field is a cyclic redundancy check (CRC) but other forms of checksums, for example, may be used.

The data packet 40 additionally has the fields 47-49: a data payload field 49; a source address field 47; and a sequence number field 48.

The data payload 49 contains the data that is being communicated between the nodes. It may, for example, be sensing data produced by a sensor 20. It may for example, be processed data produced as an interim or final result of a distributed computation process.

The data payload 49 may comprise a portion of a larger data segment that has been partitioned into separate payloads for transmission. The separate payloads are assigned a sequence number that orders the portions in the larger data segment.

The source address 47 and sequence number 48 therefore allow the receiving node 10 to uniquely identify each packet received. This can be used to ensure that packets are not received more than once. It may also be used to concatenate the received payloads 49 in the correct order to reproduce the data segment.

The information packet 50 additionally has a wake-up time field 52. This field specifies a future time at which the receiving node will wake-up to receive a data packet 40.

Figure 4A:
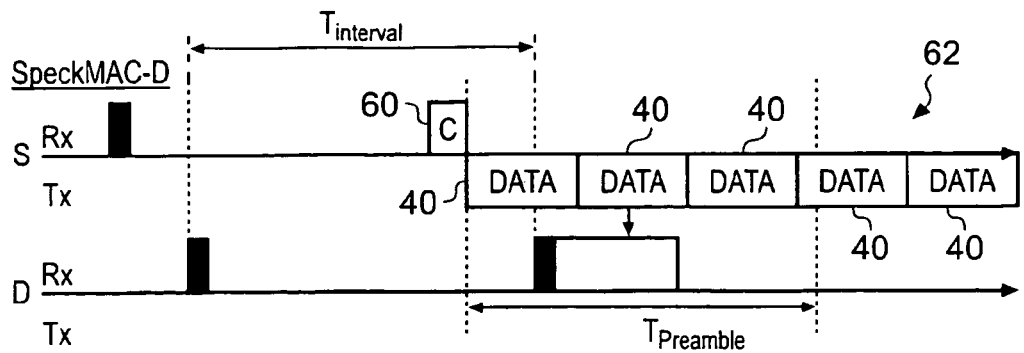
FIG. 4A illustrates data transmission according to a first embodiment.

FIG. 4A illustrates data transmission according to a first embodiment. In this embodiment data packets 40 are used but information packets 50 are not.

A source node S, first listens 60 in the communication channel. The timing of this is not scheduled and is typically referred to as random access. If the channel is free, the source node starts transmission of a concatenated sequence 62 of data packets 40. The same data packet 40 is repetitively transmitted one after the other for N times. The value N is constant and the size of a data packet 40 is also constant so the size of the concatenated sequence is also predetermined and constant. The interval $T_{interval}$ is selected so that it is less than the time needed to transmit the concatenated sequence 62. If the size of the concatenated sequence 62 is S bytes and the transmission rate is R bytes per second then $T_{interval} < S*R$.

Figure 4B:
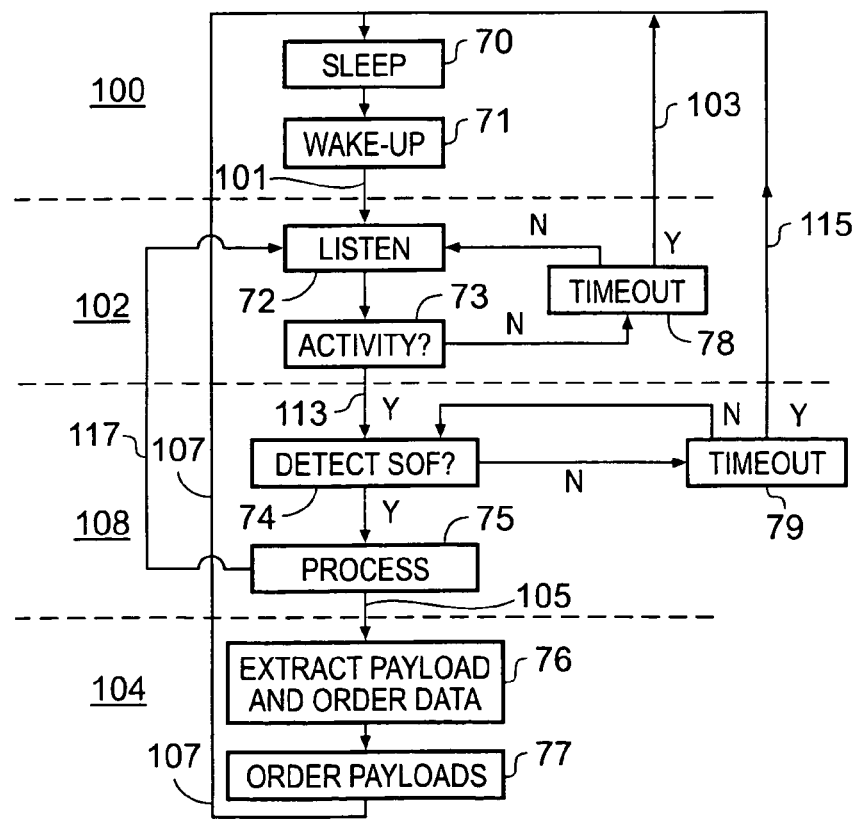
FIG. 4B illustrates a method of data reception according to the first embodiment.
Figure 4C:
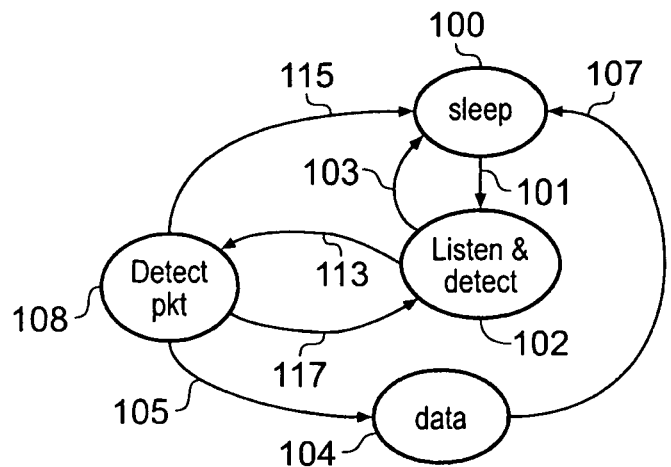
FIG. 4C illustrates a state diagram for a receiver according to the first embodiment.

The process that occurs at a destination node D is also illustrated in FIG. 4A, but the method is additionally illustrated in FIG. 4B and a transition state diagram is illustrated in FIG. 4C.

At block 70, the destination node D is in a sleep state 100. In this example, the sleep state refers to a state in which both the transceiver 18 and the processor 14 are both in a low energy consumption state. The transceiver 18 is typically switched off. It will be appreciated that the transceiver 18 may enter a low energy consumption state after a packet has been received, whereas the processor 14 may enter a low energy consumption state after the content of the packet has been processed. As reception of the packet may precede the processing of the packet content, it is possible for the sleep state to be entered in a two-stage process with the transceiver 18 first entering a low energy consumption state when the packet is received followed by the processor 14 entering a low energy consumption state when the content of the packet has been processed.

In other implementations the sleep state may be a state in which only the transceiver 18 is in a low energy consumption state, typically switched off.

At block 71 the destination node D wakes-up at a time specified by a predefined schedule. The schedule controls the transceiver 18 to wake up periodically every $T_{inteval}$ seconds. On waking-up, the destination node D enters 101 a 'listen and detect' state 102.

In the 'listen and detect' state 102, the transceiver 18 at block 72 listens to detect activity in the communications channel. If the transceiver 18 does not detect activity within a timeout period 78 then the sleeping state 100 is re-entered 103. When activity is detected at block 73, the 'detect packet' state 108 is entered 113 at block 74.

At block 74, the transceiver 18 detects the short preamble 41 and SOF 42 of the packet 40. The data received thereafter is stored to memory 16. If the transceiver 18 does not detect the SOF 42 within a timeout period 79 then the sleeping state 100 is re-entered 115. After detecting the SOF 42, the processor 14 then processes at block 75 the packet content. At this stage the transceiver 18 may be switched off.

The content of the error detection field 46 is extracted and used to test the integrity of the received data packet 40. This ensures that the data packet 40 has not been corrupted and has been correctly received. If the data packet 40 has been corrupted, the destination node D returns 117 to block 72 and attempts to receive the next packet 40 in the sequence 62 of packets.

The content of the destination address field 45 is extracted and compared with the destination node's address. If it matches, the process continues. If it does not match the node returns 115 to the sleep state 100.

As only one type of packet is used the 'data' state 104 is entered 105 as the process proceeds.

In the data state 104, the data payload 49 is extracted at block 76. The source address 47 and sequence number 48 are also extracted and the received data payloads ordered at block 77 according to that sequencing information. The destination node D then returns 107 to the sleep state 100 in which the processor 14 may enter a low energy consumption state.

The first embodiment may be modified. For example the data packets 40 may each be modified to additionally include an end-of-transmission field (not illustrated). As illustrated in FIG. 4A, the source node transmits a concatenated sequence 62 of N modified data packets 40 and the end-of-transmission field specifies the time at which the concatenated sequence 62 of modified data packets 40 end. The value of N may be selected so that the time needed to retransmit (N−1) modified data packets is greater than $T_{interval}$. If the size of the modified data packet 30 is s bytes and the transmission rate is R bytes per second then $T_{interval} < ((N-1)*s*R)$. In the data state 104, the end-of-transmission information is extracted from the received modified data packet. It may be used to adjust the schedule such that the destination node D would only exit the sleep state 70 after the current concatenated sequence 62 of modified data packets has ended.

Figure 5A:
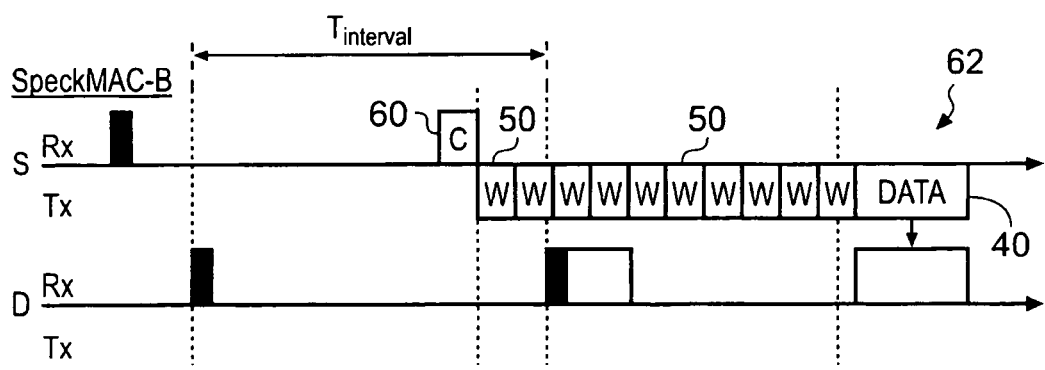
FIG. 5A illustrates data transmission according to a second embodiment.

FIG. 5A illustrates data transmission according to a second embodiment. In this embodiment data packets 40 and information packets 50 are used.

A source node S, first listens 60 in the communication channel. The timing of this is not scheduled and is typically referred to as random access. If the channel is free, the source node S starts transmission of a concatenated sequence 62 of packets 40. The sequence is the same information packet 50 repetitively transmitted one after the other for N times to form a first part of the sequence 63 and then a data packet 40 is transmitted to complete the concatenated sequence 62.

The information packets 50 are 'the same' in that they convey the same information content but are not necessarily the same in that they contain the same physical content. For example, depending on implementation, the wake-up time field 52 may specify a wake-up time in an absolute format in which case it would be expected that the information packets 50 in the concatenated sequence 62 would be the same. However, the wake-up time 52 could also be specified in a relative format such as wake-up in X seconds and in this scenario the information content X would vary (decrease) with each information packet 50 in the sequence 62 but the information conveyed would be the same i.e. a time at which to wake-up and receive the data packet. The term 'same packet' should be interpreted to mean conveying the same information (i.e.

logical content) but not necessarily exactly that same physical content. A synonym for same message would be 'redundant message' as the information content in the messages is the same so that from an information perspective one of two information packets 50 in a sequence 62 is redundant to a receiver if both information packets 50 were received.

In one implementation, the value N is constant, the size of a data packet 40 is also constant and the size of an information packet 50 is also constant so the size of the concatenated sequence 62 is also predetermined and constant. The interval $T_{interval}$ is selected so that it is less than the time needed to transmit the concatenated sequence 62. If the size of the concatenated sequence 62 is S bytes and the transmission rate is R bytes per second then $T_{interval} < S*R$.

In another implementation, the value N is constant and the size of an information packet 50 is also constant so the size of the first part of the sequence 62 is also predetermined and constant. The interval $T_{interval}$ is selected so that it is less than the time needed to transmit the first part of the sequence 62. If the size of the first part of the sequence 62 is S' bytes and the transmission rate is R bytes per second then $T_{interval} < S'*R$.

Figure 5B:
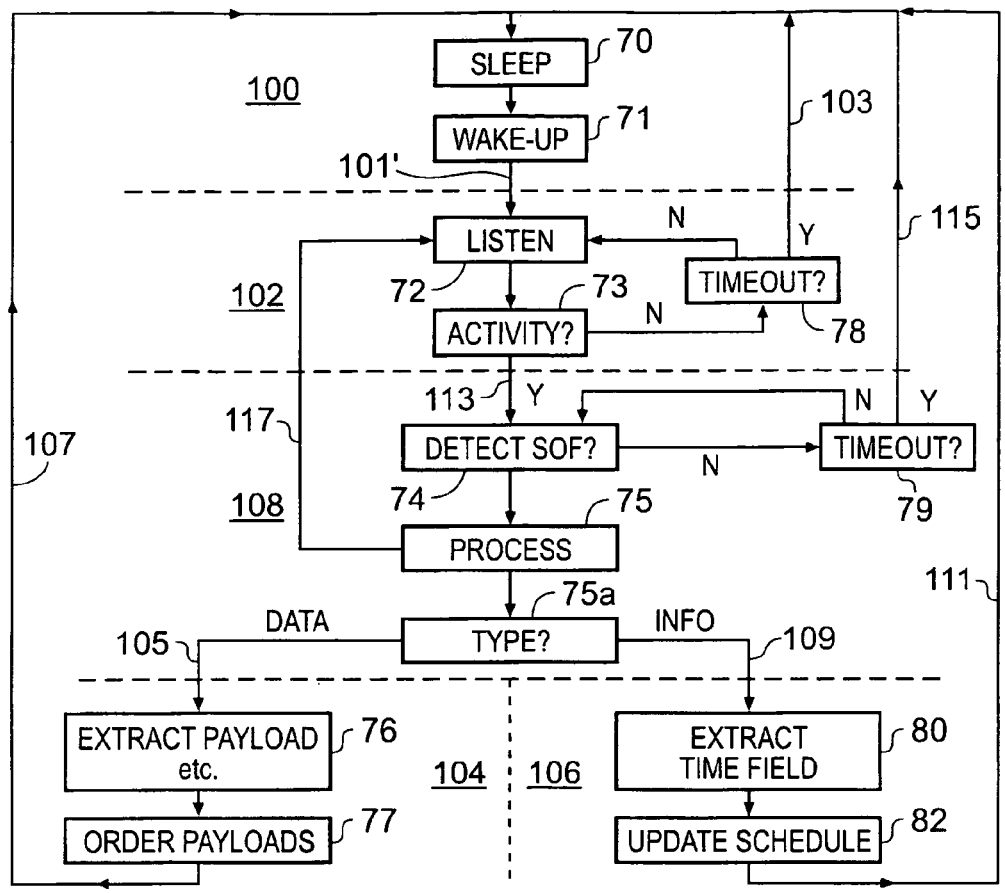
FIG. 5B illustrates a method of data reception according to the second embodiment.
Figure 5C:
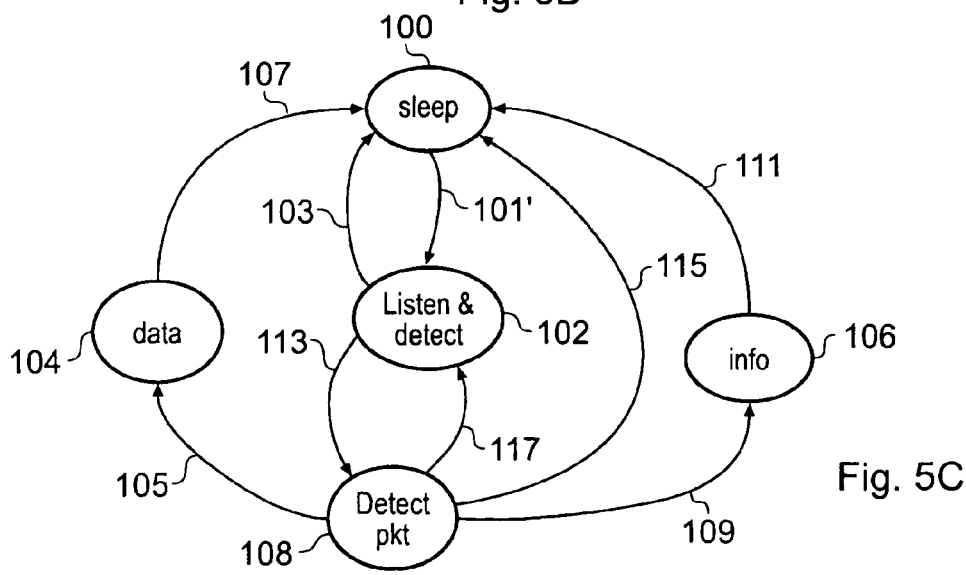
FIG. 5C illustrates a state diagram for a receiver according to the second embodiment.

The process that occurs at a destination node D is also illustrated in FIG. 5A, but the method is additionally illustrated in FIG. 5B and a transition state diagram is illustrated in FIG. 5C.

The Figures are in some respects similar to those of FIGS. 4B and 4C. The major differences are that this embodiment uses two types of packets—a data packet 40 and an information packet 50. The state transition diagram has an extra information state 106 at which a received information packet 50 is processed. A received information packet 50 allows the wake-up schedule to be augmented so that the destination node D wakes-up before the period $T_{interval}$ has expired to receive a data packet 40. The condition for transition between the sleep state 100 and the listen and detect packet state 102 is therefore different and is therefore labelled 101'.

At block 70, the destination node D is in a sleep state 100. In this example, the sleep state 100 refers to a state in which both the transceiver 18 and the processor 14 are both in a low energy consumption state. The transceiver 18 is typically switched off. It will be appreciated that the transceiver 18 may enter a low energy consumption state after a packet has been received, whereas the processor 14 may enter a low energy consumption state after the content of the packet has been processed. As reception of the packet may precede the processing of the packet content, it is possible for the sleep state to be entered in a two-stage process with the transceiver 18 first entering a low energy consumption state when the packet is received followed by the processor 14 entering a low energy consumption state when the content of the packet has been processed.

In other implementations the sleep state may be a state in which only the transceiver 18 is in a low energy consumption state, typically switched off.

At block 71 the destination node D wakes-up at a time specified by a predefined schedule. The schedule at least controls the transceiver 18 to wake up periodically every $T_{interval}$ seconds. However the schedule may be augmented via the information state 106. On waking-up, the destination node D enters 101' a 'listen and detect' state 102.

In the 'listen and detect' state 102, the transceiver 18 at block 72 listens to detect activity in the communications channel. If the transceiver 18 does not detect activity within a timeout period 78, then the sleeping state 100 is re-entered 103. When activity is detected at block 73, the process moves to the detect packet state 108 at block 74.

At block 74, the transceiver 18 detects the short preamble 41 and SOF 43 of the packet 40, 50. The data received thereafter is stored to memory 16. If the transceiver 18 does not detect an SOF 43 within a timeout period 79, then the sleeping state 100 is re-entered 115. After detecting the SOF 43, the processor 14 then processes at block 75 the packet content. At this stage the transceiver 18 may be switched off.

The content of the error detection field 46 is extracted and used to test the integrity of the received packet 40,50. This ensures that the data packet 40 has not been corrupted and has been correctly received. If an information packet 50 has been corrupted, the destination node D returns to block 72 and attempts to receive the next packet 50 in the sequence 62 of packets. If the data packet 40 has been corrupted, the destination node D discards the packet and returns to block 70.

The content of the destination address field 45 is extracted and compared with the destination node's address. If it matches, the process continues. If it does not match the node returns 115 to the sleep state 100.

At block 75A, the content of the packet type field 44 is also extracted. If the received packet type is 'data', the 'data' state 104 is entered 105 as the process proceeds. If the received packet type is 'information', the 'information' state 106 is entered 109 as the process proceeds.

In the data state 104, the data payload 49 is extracted at block 76. The source address 47 and sequence number 48 are also extracted and the data payloads ordered at block 77 according to that sequencing information. The node then returns 107 to the sleep state 100 in which the processor may enter a low energy consumption state.

In the information state 106, the time field 52 is extracted at block 80. This time field indicates when the following data packet 40 in the sequence 62 will be transmitted. The schedule used to wake-up the destination node at block 71 is augmented at block 82 to include that time and the destination mode then returns 111 to the sleep state 100 in which the processor enters a low energy consumption state.

Although embodiments of the present invention have been described in the preceding paragraphs with reference to various examples, it should be appreciated that modifications to the examples given can be made without departing from the scope of the invention as claimed.

Whilst endeavoring in the foregoing specification to draw attention to those features of the invention believed to be of particular importance it should be understood that the Applicant claims protection in respect of any patentable feature or combination of features hereinbefore referred to and/or shown in the drawings whether or not particular emphasis has been placed thereon.

We claim:

1. A method comprising:
   creating a packet comprising a header and data; and
   transmitting, from a transmitter to a receiver in an unsynchronised, ad-hoc, low-power, wireless network, without a schedule, the same created packet a plurality of times in succession one after the other as a concatenated sequence in the same communication channel, wherein the same created packet is an information packet comprising a time field and not comprising a data payload.

2. A method as claimed in claim 1, wherein the start of the sequence is random.

3. A method as claimed in claim 2, wherein the concatenated sequence has a predefined constant length that is greater than a period during which a receiver is regularly switched off.

4. A method as claimed in claim 1, wherein each of the plurality of packets comprises a field that enables a receiver to determine when the sequence ends and comprises a field that enables a receiver to determine when the packet ends.

5. A method as claimed in claim 1, wherein packets transmitted in the concatenated sequence of packets within the same communications channel and the concatenated sequence comprise a data packet that terminates the sequence.

6. An electronic communications device comprising:
a transmitter configured to transmit data to a receiver using an unsynchronized, ad hoc, low power, wireless network; and
processing circuitry configured to create a packet comprising a header and data;
wherein the transmitter is configured to transmit, without a schedule, the same created packet a plurality of times in succession one after the other as a concatenated sequence in the same communication channel, and wherein
the same created packet is an information packet comprising a time field and not comprising a data payload.

7. A method comprising:
switching on a receiver according to a first schedule;
detecting reception of one of a succession of same packets transmitted, from a transmitter to a receiver in an unsynchronised, ad-hoc, low-power, wireless network, without a schedule one after the other as a concatenated sequence in the same communication channel; wherein the same packet is an information packet comprising a time field and not comprising a data payload;
extracting data from the received packet; and
switching off the receiver until it is next scheduled to be switched on.

8. A method as claimed in claim 7, wherein detecting reception of a packet includes detecting the correct receipt of a packet or identifying an address contained in the packet.

9. A method as claimed in claim 7, wherein the first schedule is periodic.

10. A method as claimed in claim 9, wherein the period is less than a length of the concatenated sequence.

11. A method as claimed in claim 7, wherein the extracted data is the time field of the information packet and is used to augment the first schedule to include a new wake-up time before the next scheduled wakeup, and wherein the receiver is switched off until the new scheduled wake-up time.

12. An electronic communications device, the device comprising:
a receiver configured to detect reception of one of a succession of same packets transmitted, from a transmitter in an unsynchronised, ad-hoc, low-power, wireless network, without a schedule one after the other as a concatenated sequence in the same communication channel, wherein the same packet is an information packet comprising a time field and not comprising a data payload; and
processing circuitry configured to switch on the receiver according to a first schedule, to extract the time field from a received information packet and to switch off the receiver until a time, dependent upon the extracted time field, for receiving a data packet comprising a data payload.

13. A method comprising:
at an unscheduled time, transmitting, from a transmitter to a receiver in an unsynchronised, ad-hoc, low-power, wireless network, a plurality of times in succession, one after the other as a concatenated sequence in the same communications channel, an information packet for determining a wake-up time at a receiver; wherein the same packet is an information packet comprising a time field and not comprising a data payload; and
transmitting, from the transmitter to the receiver in the unsynchronised, ad-hoc, low-power, wireless network, a data packet comprising a data payload at the wake-up time.

14. A computer readable physical entity tangibly embodying a computer program which when loaded into a processor enables the processor to perform the method of claim 1.

15. A computer readable physical entity tangibly embodying a computer program which when loaded into a processor enables the processor to perform the method of claim 7.

16. A computer readable physical entity tangibly embodying a computer program which when loaded into a processor enables the processor to perform the method of claim 13.

* * * * *